(No Model.)
W. T. CARROLL.
SADDLE FOR TOP ROLLS OF SPINNING MACHINES.
No. 453,854. Patented June 9, 1891.
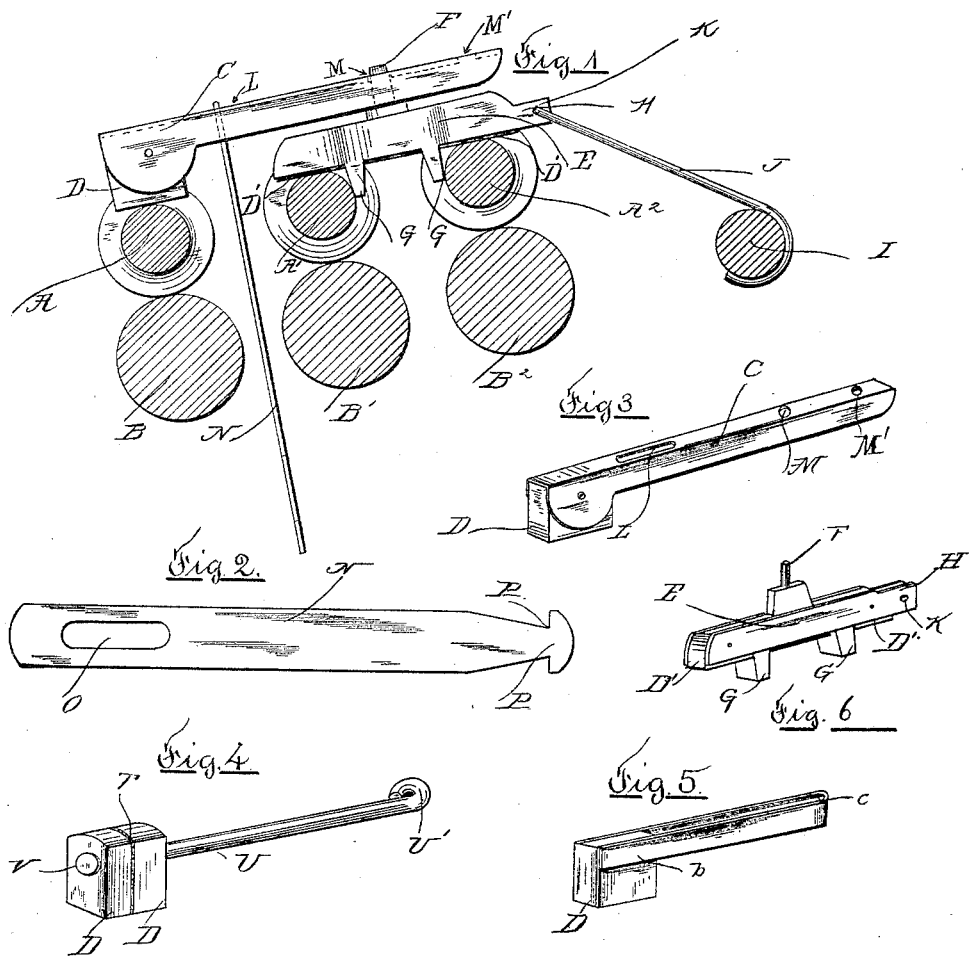
Witnesses
Walter S. Bowen
Jona. Luther
Inventor
William T. Carroll

UNITED STATES PATENT OFFICE.

WILLIAM T. CARROLL, OF WORCESTER, MASSACHUSETTS.

SADDLE FOR TOP ROLLS OF SPINNING-MACHINES.

SPECIFICATION forming part of Letters Patent No. 453,854, dated June 9, 1891.

Application filed November 27, 1889. Serial No. 331,807. (No model.)

*To all whom it may concern:*

Be it known that I, WILLIAM T. CARROLL, a citizen of the United States, resident at Worcester, in the county of Worcester, in the Commonwealth of Massachusetts, have invented certain new and useful Improvements in Saddles for Top Rolls of Spinning-Machines, of which the following, in connection with the accompanying drawings, is a specification sufficiently clear and descriptive to enable those skilled in the art to which my invention belongs to make and use the same.

The object of my invention is to provide saddles which will not slide out of place while in operation or fall off the rolls when relieved from the weight and stirrup, making it much easier and less troublesome to adjust the stirrup and weight for the work; also, whereby they will have the least possible amount of friction in their bearing on the rolls; also, a special form of upper saddle, made of sheet metal, as herein described; also, a saddle whereby the middle top roll can be relieved from the weight, if desired, in case a long-staple fibrous material is to be used in spinning.

My improvement consists, first, in providing the under saddle with depending stems on the under side, which project in between the two back top rolls, and with an upwardly-projecting stem on the upper side adapted to enter a hole in the upper saddle, and with anti-friction flat-surfaced bearings of vulcanized fiber or its equivalent leatheroid or parchmentized fiber fastened in a groove in the under side thereof, and with a rear extension with holes therein for a hook which hooks onto the rear cap-bar. This hook and the depending projections serve either separately or together for one purpose.

One of the special advantages of the dependent stem or hook is that the flat-surfaced bearing can be held nearer its end on the journal of the roll and will not project beyond the periphery of the roll, so that any cotton waste winding round the roll can be more easily removed.

My improvement consists, secondly, in forming the upper saddle out of sheet metal, having sides and top, with jaws formed in the front end, which form an open space in which a flat-surfaced anti-friction bearing of vulcanized fiber or its equivalent leatheroid or parchmentized paper is fastened, and having holes through the top for the upwardly-projecting stem of the under saddle and a slot for the stirrup.

Referring to the drawings, Figure 1 represents a side view of the saddles, showing their adjustment together on the journals of the top rolls. Fig. 2 represents the form of the stirrup. Fig. 3 is a perspective view of the upper saddle shown in Fig. 1. Fig. 4 is a perspective view of a top saddle made of wire, and having strips of felt cloth between the flat-surfaced anti-friction bearings, its other end being bent so as to hook onto the stem of the under saddle, this top saddle being shown and described herein as suitable for use with my improved under saddle. Fig. 5 is a perspective view of an upper saddle formed of sheet metal, so as to hook onto the stem of the under saddle at one end, the other end having the anti-friction flat-surfaced bearing fastened therein, the saddle being shown and described herein as suitable for use with my improved under saddle. Fig. 6 is a perspective view of the under saddle shown in Fig. 1.

Similar letters of reference represent similar parts in the several drawings.

A A' A² represent the top rolls, resting on the under rolls B B' B² at the middle of the journals.

I denotes the rear cap-bar.

C represents the upper saddle, formed of sheet metal, with sides and top, and with an open space on the under side, having depending jaws in the front end, in which are fastened flat-surfaced bearings D of vulcanized fiber, it also having holes M M' for the stem F of the under saddle, and a slot L for the stirrup. The rear hole M', being directly over the center of the rear top roll, is designed to be used when a long staple of fiber is to be spun, in which case the under saddle can be moved back, placing the depending stems one back and the other in front of the rear top roll. The upwardly-projecting stem F will in this case occupy the rear hole M' of the upper saddle.

E denotes the under saddle, having a slot or recess in each end on the under side, in which is fastened a block of vulcanized fiber D, having a flat surface for the bearings on the journals of the rolls.

G G denote dependent stems, and F an upwardly-projecting stem. The rear extension H, with holes K, is for the hook J, which hooks onto the rear cap-bar I.

Having thus fully shown and described my invention, what I claim, and desire to secure by Letters Patent, is—

1. In saddles for top rolls of spinning-machines, the under saddle having dependent stems G G, rear extension H, provided with holes K, and a stem F on the upper side thereof, and having bearings of vulcanized fiber or its equivalent with flat surfaces, substantially as shown and described.

2. In saddles for top rolls of spinning-machines, the upper saddle made of sheet metal, having sides and top with jaws in the front end, and having a bearing D of vulcanized fiber or its equivalent with a flat surface fastened therein, a slot L for the stirrup, and hole M for the stem F of the under saddle, substantially as shown and described.

3. The combination, with the under saddle having plane-surfaced bearings and depending stems G G on the under side thereof and stem F on the upper side thereof, of the upper saddle having a hole M for the reception of the stem F, a slot for the passage of the upper end of the stirrup, and a plane-surfaced bearing, substantially as shown and described.

4. The combination, with the upper saddle having a plane-surfaced bearing of vulcanized fiber or its equivalent, holes M M' for the reception of stem F of the under saddle, and slot L for the stirrup, of the under saddle having plane-surfaced bearings and depending stems G G on the under side thereof and stem F on the upper side thereof, rear extension H, provided with holes K, the hook J, and rear cap-bar I, substantially as shown and described.

WILLIAM T. CARROLL.

Witnesses:
    JONA. LUTHER,
    JOSEPH P. YOUNG.